Patented Aug. 16, 1938

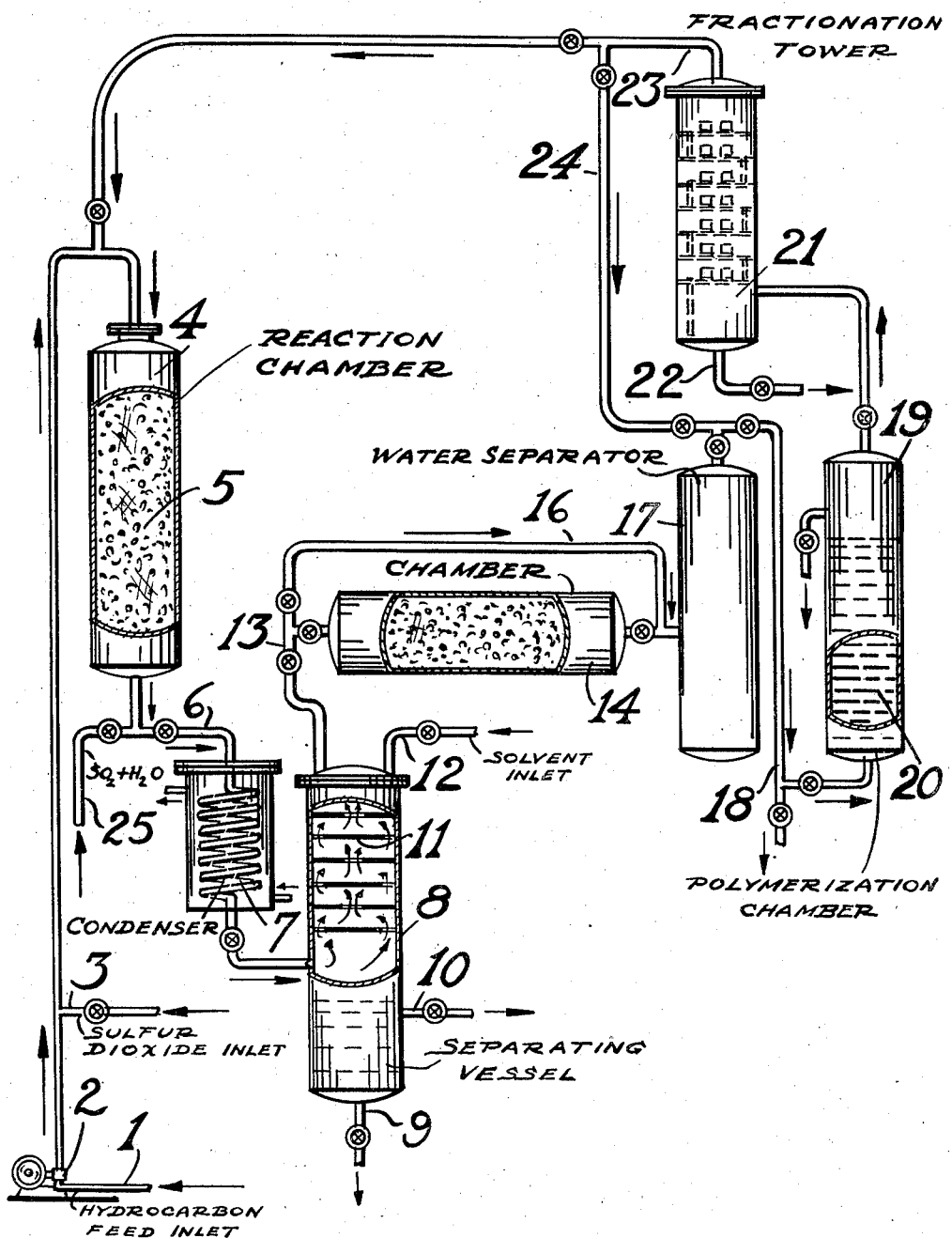

2,126,817

UNITED STATES PATENT OFFICE 2,126,817

DEHYDROGENATION OF HYDROCARBONS

Raphael Rosen, Elizabeth, N. J., assignor to Standard Oil Development Company, a corporation of Delaware Application June 3, 1936, Serial No. 83,264

11 Claims. (Cl. 196—10)

The present invention relates to the production of unsaturated hydrocarbons from those of a more saturated nature, and is particularly directed to an improved method for accomplishing this result. More specifically, the present invention provides for the dehydrogenation of hydrocarbon material in the presence of a catalyst and of an addition agent having a tendency to influence the equilibrium of the reaction in the direction of the formation of larger quantities of unsaturates.

Recently the problem of dehydrogenating hydrocarbons has become intensified by the development of numerous processes for the production of synthetic gasoline from low molecular weight olefins, such as propylene and butylenes. These hydrocarbons do not exist, as such, in high concentrations in any available source but must be obtained by the dehydrogenation of saturated refinery gases or natural gases, or light gasolines containing butane and propane. Therefore, the practicability of those processes for the production of synthetic gasoline, which require olefins as a starting material, is dependent, to a large extent, upon the cost of converting the saturated hydrocarbons into olefins.

The catalytic dehydrogenation of paraffin hydrocarbons is a well explored field of research. Most of the developments in this field, however, have been in the discovery of suitable catalysts. Among the more common catalysts developed for this type of reaction have been the catalysts described in Patent No. 1,913,940 containing an oxide of a metal of Group VI of the periodic system alone or mixed with other difficultly reducible oxides, such as alumina, active charcoal, active silica, lustrous carbon, aluminum borate, the catalysts described in Patent No. 1,913,941, meta-phosphates, and many others of a similar nature. In the process of the present invention any of these well known dehydrogenation catalysts may be employed.

According to the present invention the yield per pass of unsaturates, obtainable by dehydrogenation of more saturated hydrocarbons, particularly the dehydrogenation of paraffins of the nature of butane, is increased by adding an oxide of sulfur or nitrogen, such as $SO_2$, $SO_3$, $NO_2$ or $NO$, to the reaction mixture. It is to be understood that the production of oxygenated organic compounds is not contemplated by the present invention. Thus, if air or oxygen be introduced into the reaction chamber at all, as for the purpose of reducing carbon deposition on the catalyst, it is employed in amounts insufficient to oxidize the hydrocarbons present to oxygenated organic compounds.

Because of its relative cheapness, non-corrosive properties, and greater effectiveness, sulfur dioxide is much to be preferred for the purpose of the present invention. Investigation has indicated that by using sufficient sulfur dioxide and a proper temperature, a very high conversion of the initial material to the desired unsaturates is possible.

It is not clearly understood what function the gaseous oxide plays. It may be assumed that in some cases it reacts with the hydrogen produced by dehydrogenation, thereby eliminating this hydrogen and shifting the equilibrium of the reaction toward the formation of larger amounts of the desired unsaturates. By reason of the fact, however, that hydrocarbons can be dehydrogenated by the action of sulfur dioxide below temperatures which are normally suitable for dehydrogenation of these hydrocarbons, there is reason to believe that at least in these cases the sulfur dioxide reacts directly with the hydrocarbon, especially if the hydrocarbon contains a tertiary carbon atom.

The data published by Frey and Hupke, in Industrial & Engineering Chemistry, vol. 25, page 54, 1933, on the equilibrium composition of gases from the dehydrogenation of isobutane show that at temperatures as low as 300° C. some conversion of isobutane into isobutylene and hydrogen is possible. The composition of the reaction mixture at this temperature appears to reach equilibrium when it contains about 98% isobutane and about 2.0% of isobutylene and hydrogen. When one of the gaseous oxides, employed according to the present invention, is present, it reacts with this hydrogen, thereby destroying the equilibrium and making possible a further conversion of the isobutane to isobutylene.

The reactions which presumably occur are as follows:

$$SO_2 + 3H_2 \rightarrow H_2S + 2H_2O$$
$$SO_2 + 2H_2S \rightarrow 3S + 2H_2O$$

That these reactions do occur is indicated by the fact that the off-gases contained hydrogen sulfide, free sulfur, water, and some excess sulfur dioxide.

On the other hand, experience has shown that when the reaction is conducted in the absence of a dehydrogenation catalyst, the presence of one of the gaseous oxides enumerated increases the yield of unsaturates to a much greater extent than can be explained by a mere unbalancing of equilibrium. It is assumed that in such cases the sulfur dioxide reacts directly with the hydrogen of the hydrocarbon, particularly with a hydrogen attached to a tertiary carbon atom. This conclusion is strengthened by the fact that the conversion of hydrocarbons to less saturated hydrocarbons can be effected at temperatures much below that at which a thermal splitting off of hydrogen will occur. Even at temperatures as low as 300° F. a noticeable dehydrogenation of the hydrocarbon undergoing treatment occurs. Thus, according to the present invention, there is contemplated not only the employment of one of these gaseous oxides in the catalytic dehydrogenation of hydrocarbons but in the dehydrogenation of these hydrocarbons in the presence of contact masses which are not dehydrogenation catalysts and in the absence of any contact mass.

The amount of sulfur dioxide to be added to the initial material for the dehydrogenation may vary within wide limits. In general, the greater the quantity of sulfur dioxide added the greater will be the conversion per pass of the initial material to less saturated hydrocarbons. The upper limit of the amount of gaseous oxide added is, of course, that determined by the economic balance between the extent of conversion desired and a practicable capacity of the reaction chamber, it being apparent that the greater the amount of $SO_2$ employed the less will be the capacity of the reaction chamber for the desired reaction. Indications are, however, that, by suitably adjusting the amount of $SO_2$ employed, conversions of the hydrocarbons, per pass, higher than those attainable by hitherto known methods, can be obtained without decreasing the capacity of the reaction chamber below commercial requirements. Usually it is desirable to employ an amount of $SO_2$ exceeding the amount theoretically required to react with the evolved hydrogen by from 10 to 25%.

In general, the conditions to be employed when a dehydrogenation catalyst is used are substantially the same as those employed in the absence of sulfur dioxide. Due to the effect of the sulfur dioxide on the equilibrium of the reaction, however, it is possible, if desired, to operate in the presence of sulfur dioxide at temperatures from 150° to 300° F. below that required for a corresponding dehydrogenation in the absence of sulfur dioxide. Accordingly, as a result of the present invention, the temperature range of from about 900° F. to 1150° F., ordinarily employed for catalytic dehydrogenation, is expanded to a lower temperature limit of about 650° F.

The process of the present invention is usually conducted at atmospheric pressure. As indicated above, reduced pressure may be employed. When the dehydrogenation is conducted as a preliminary step to polymerization, as is usually the case, it is very advantageous to carry out the dehydrogenation under pressure, since it is much more economical to develop the pressure necessary for polymerization, usually not in excess of 600 lbs. per square inch, by applying at least part of the pressure to the initial material for the dehydrogenation, on which pressure may be built up while said material is in the liquid phase, than by applying all the pressure to the vaporous products of the dehydrogenation. Since dehydrogenation is usually accompanied by an increase in volume, however, it is not to be expected that it would be favored by pressure. Accordingly the practice in the art has been to conduct the dehydrogenation at atmospheric pressure.

According to the present invention, the dehydrogenation occurs without any appreciable increase in volume of the primary reactants, namely, hydrocarbon and hydrogen. Altho the volumetric quantities of products produced theoretically exceeds those of the initial materials, it is to be remembered that the hydrogen produced is removed from the reaction. Consequently, the effect of pressure, which would normally tend to reverse the dehydrogenation reaction, is eliminated. Therefore, the dehydrogenation, according to the present invention, may be carried out under any desired elevated pressure without any substantial loss in efficiency.

As previously indicated, the dehydrogenation of $C_3$ and $C_4$ hydrocarbons is usually conducted for the purpose of providing an initial material for the production of synthetic gasoline by polymerization. Since the presence of hydrogen in substantial amounts has been found to be undesirable in polymerizations of this type, it has been the practice to separate the olefins from the hydrogen before subjecting the olefins to polymerization. This separation step constitutes a very substantial item in the cost of producing gasoline from $C_3$ and $C_4$ saturated hydrocarbons.

By the present invention the combination of dehydrogenation and polymerization has been greatly improved by reason of the fact that when sulfur dioxide is employed in the required amount no free hydrogen is contained in the reaction product. The free sulfur and hydrogen sulfide, which are contained in the reaction product, are much more readily removable than free hydrogen. A specific embodiment of the present invention, therefore, is the dehydrogenation of $C_3$ and $C_4$ hydrocarbons in the presence of a catalyst and sulfur dioxide, followed by the condensation of sulfur and the removal of hydrogen sulfide by washing with high boiling alkylolamines or alkali metal salts of phenols, or any other suitable solvent, and then by polymerization of the olefins. Alternatively, the hydrogen sulfide may be removed from the reaction products from the dehydrogenation zone while they are still hot by contacting them with luxmass (hydrated iron oxide), or any other contact mass containing a metal oxide which will react with hydrogen sulfide, and sulfur may then be removed by condensation.

Where the hydrogen sulfide is removed by reaction with a metal oxide, it will also be advantageous to precede the polymerization by any suitable expedient for the removal of water. These purification steps result in a reduction in the temperature of the olefins, which is necessary in any case where the polymerization is of the catalytic type, particularly where it is effected by sulfuric acid or phosphoric acid at temperatures not exceeding 250° C. It is to be understood, however, that the polymerization may also be effected simply by subjecting the olefins to a relatively high temperature and a high pressure in the known manner. Such a polymerization is usually conducted under a pressure considerably in excess of 500 lbs. per square inch, such as 1000 lbs. per square inch, and at a temperature between 600° and 900° F.

The removal of sulfur dioxide from the reaction product is not necessary since sulfur dioxide has no detrimental effect on the polymerization, especially where it is effected by sulfuric or phosphoric acid. If it be desired to remove the sulfur dioxide, however, this may be readily accomplished by scrubbing the reaction products with a mixture of aromatic amines, such as xylidine or toluidine and water, or by scrubbing with sodium thiosulfate solution, or with alkylolamines or phenates.

Another application of the present invention is the formation of diolefins from olefins or from paraffins. Ordinarily, in the dehydrogenation of paraffins, the quantity of sulfur dioxide to be employed may vary from about one-tenth of a mole to ½ a mole of sulfur dioxide per mole of hydrocarbon. With greater amounts of sulfur dioxide the olefins formed tend to become more unsaturated to form diolefins. Due to the stronger bond between hydrogen and carbon in diolefins, however, it is preferable to first form the olefins and then to convert the olefins to diolefins at a higher temperature but at much higher thruputs or lower contact times. Usually the conversion to diolefins is effected at a temperature about 200° F. above the temperature employed for the production of the olefins. A temperature between 1000-1200° F. should be selected for the production of diolefins from olefins. The reaction products of such a conversion should be immediately quenched to a temperature below about 500° F. so as to avoid losses of the diolefins.

A further application of the present invention is in the production of acetylene from methane, or ethylene and in the production of ethylene from ethane. Many thermal processes for the conversion of methane to acetylene and ethylene at temperatures of at least 1832° F. are known. The addition of substantial quantities of sulfur dioxide to the methane increases the yield of acetylene at temperatures above 1832° F. and permits the production of substantial quantities of ethylene at temperatures between about 1300° and 1600° F. By increasing the time of treatment at these temperatures the yield of ethylene is decreased in favor of the production of acetylene. When ethylene is used as the initial material at these temperatures satisfactory yields of acetylene are obtained.

In the accompanying drawing a front elevation of a plant, suitable for carrying out the present invention, is illustrated in diagrammatic form. Referring to the drawing, 1 is a feed line for hydrocarbons to be dehydrogenated, 2 is a compressor which may be employed in the event that the dehydrogenation is to be conducted under pressure, 3 is an inlet line for sulfur dioxide, 4 is a reaction chamber containing a dehydrogenation catalyst 5, 6 is a conduit for conducting the reaction products from chamber 4 to a condenser 7 from which said products are discharged into a separating vessel 8 in the bottom of which any sulfur formed and the olefins, if they be of sufficiently high molecular weight, are deposited and from which they may be drawn off thru lines 9 and 10 respectively.

It is desirable to convert any hydrogen sulfide contained in the reaction products from chamber 4 into sulfur so as to facilitate the separation of all sulfur from these reaction products. To this end it is often desirable to add a quantity of sulfur dioxide and a relatively small amount of water vapor to the reaction products issuing from chamber 4 thru line 25. When this expedient is adopted it will be desirable to provide sufficient time for the reaction between sulfur dioxide and hydrogen sulfide by interposing a chamber in the nature of a soaking drum between reaction chamber 4 and condenser 7, or to make the coil in condenser 7 of sufficient length to provide an adequate period of time for this reaction.

Separator 8 may be provided with internal construction, such as baffle plates, or discs and doughnuts, 11, and with an inlet 12 for a solvent for hydrogen sulfide. If a solvent is not employed and the olefins produced are of low molecular weight, such as propylene and butylene, they are conducted thru line 13 thru a chamber 14 packed with a contact mass, such as luxmass, which removes hydrogen sulfide. If a solvent for hydrogen sulfide has been employed in chamber 8, the olefins are bypassed around chamber 14 by conduit 16.

The vapors issuing from chamber 14 or from chamber 8, as the case may be, pass thru a water separator 17 which may be filled with cooling coils for the condensation of the water, or may be packed with a dehydrating agent of any common type. The dried vapors are then conducted thru line 18 to a suitable receiver, or in the case of olefins, such as propylene and butylene, to a polymerization chamber 19 which may contain a body of sulfuric acid 20, or may be packed with clay or a phosphoric acid catalyst, or any other suitable polymerization catalyst. The chamber 19 may also be free from any catalyst if polymerization is to be effected by the conjoint action of temperature and pressure. A suitable outlet may be provided in chamber 19 for the withdrawal of any liquid polymer which may collect therein. The vaporous products issuing from 19 pass to a fractionating tower 21 from which liquid products are drawn off thru line 22 and vapors and gases which may be composed of unconverted initial material from tower 4, some unpolymerized olefins, and in certain instances some sulfur dioxide, are drawn off thru line 23. When such gases or vapors contain a substantial percentage of unsaturates, it may be advantageous to pass them again into line 18 thru line 24. Otherwise they are recycled to reaction chamber 4.

Various modifications may be made in the apparatus shown in order to adapt it to the particular process involved. For example when the process involved is the production of acetylene either from ethylene or from methane, the reaction chamber 4 is preferably followed immediately by a quenching zone. In case the hydrogen sulfide is washed out of the dehydrogenation product, in a process in which the olefins produced are polymerized and then hydrogenated, it may be desirable to recover the hydrogen sulfide from the wash liquid, react it with a metal or with oxygen for the production of hydrogen, and use the hydrogen so produced for the hydrogenation of the polymer.

The following results of trial experiments indicate qualitatively the nature of the improvement effected by the present invention. These examples are not intended to set forth the ideal working conditions, but are simply described to demonstrate the manner in which dehydrogenation is effected under any given set of conditions by the addition of SO₂ to the feed stock.

*Example 1*

A mixture of isobutane and sulfur dioxide was passed over a catalyst composed of chromic oxide and alumina on stoneware and made from 35 grams of alumina calculated as Al(NO₃)₃9H₂O, 25 grams of chromic oxide calculated as

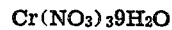

Cr(NO₃)₃9H₂O and 250 grams of stoneware. The composition of the feed mixture and the rate of flow of the mixture were so adjusted that 94 volumes of isobutane and 40 volumes of SO₂ per volume of catalyst per hour were fed through the reaction chamber.

The reaction chamber was encased in a bronze block maintained at a temperature of 1010° F.

A sample of the product taken after 1½ hours on stream contained 12.1% hydrogen, 1.6% CO, 0.9% $CH_4$, 0.3% $C_2$ hydrocarbons, 62.2% isobutane and 22.9% isobutylene. 27% of the initial isobutane reacted and the efficiency of the reaction, i. e., the amount of reacted isobutane which was converted to isobutylene was 98%.

*Example 2*

After the reaction described in Example 1 had been on stream about three hours the feed rate was changed to 102 volumes of isobutane and 40 volumes of $SO_2$ per volume of catalyst per hour. At the end of four hours a sample of the product was found to contain no hydrogen, 1.1% CO, 0.3% $C_2$ hydrocarbons, 74.4% of isobutane and 24.2% of isobutylene. 25% of the initial isobutane reacted and the efficiency of the reaction was 98%.

*Example 3*

At the end of the fourth hour in the run described above the feed rate was changed to 46 volumes of isobutane and 40 volumes of $SO_2$ per volume of catalyst per hour. A sample of the product taken at the end of the fifth hour contained 0.2% hydrogen, 0.1% CO, 0.9% $CH_4$, 1.1% $C_2$ hydrocarbons, 0.5% $C_3$ hydrocarbons, 54.1% isobutane and 43.1% isobutylene. 43+% of the initial isobutane reacted with an efficiency of 99+%.

*Example 4*

After the fifth hour of the run previously described the temperature of the bronze block was raised to 1040° F. and the feed rate was changed to 43 volumes of isobutane and 40 volumes of $SO_2$ per volume of catalyst per hour. A sample of the product taken at the end of the tenth hour contained no hydrogen, carbon monoxide or methane, 0.5% of $C_2$ hydrocarbons, 0.5% of $C_3$ hydrocarbons, 52.4% of isobutane and 46.6% of isobutylene. 46+% of the initial isobutane reacted with an efficiency of 99+%.

*Example 5*

A run, similar in all respects to the previous run except that no sulfur dioxide was added, was conducted with a feed rate of 83.2 volumes of isobutane per volume of catalyst per hour and a block temperature of 1010° F. At the end of the fourth hour a sample of the product contained 15.8% hydrogen, 1.8% $CH_4$, .4% $C_2$ hydrocarbons, .1% $C_3$ hydrocarbons, 63.5% isobutane and 18.4% isobutylene. 22.5% of the initial isobutane reacted with an efficiency of 95%. Comparing these results with the results obtained in Example 2, it is seen that, although in the latter case the feed rate was much higher, the per cent reacting and the efficiency of the reaction was also greater. More important, however, is the fact that in the latter case the reaction product was free from hydrogen, indicating that the $SO_2$ had eliminated the hydrogen and had influenced the equilibrium to the production of greater amounts of isobutylene.

*Example 6*

Isobutane was passed at 1040° F. over a catalytically inactive stoneware at the rate of 1.0 cu. ft./hr./340 cc. of stoneware. There was no volume increase and the percentage of unsaturates in the exit gas was 0.9%.

$SO_2$ was then mixed with the feed in a proportion of one volume of $SO_2$ for three volumes of feed. With the rate of feed of isobutane remaining the same, the content of unsaturates in the exit gas increased to 23.0% and the volume increase was 1.01.

*Example 7*

A mixture of isobutane and $SO_2$ was passed at a rate corresponding to 1.0 cu. ft./hr. of isobutane and .38 cu. ft./hr. of $SO_2$ over 340 cc. of pumice stone at 1040° F. There was no increase in volume. The exit gas contained 9.0% of unsaturates. The $SO_2$ was then omitted from the feed, the flow of isobutane remaining unchanged. The content of unsaturates in the reaction product dropped to 2.0% and the volume of the reaction gas increased to 1.02.

In the above examples, in which sulfur dioxide was employed, the sample of the product was analyzed only after being scrubbed with caustic for the removal of sulfur compounds. It is also to be noted that the relatively high percentage of hydrogen in the sample described in Example 1 is attributable to the fact that the reaction unit had not yet been brought to reaction conditions. It usually requires from two to three hours to adjust all the factors involved, such as feed rate and temperature, to a point where uniform results are obtainable.

It is noted that the product always contains a large percentage of isobutane. In practice it is customary to contact this product directly with sulfuric acid at suitable conditions to convert the isobutylene into higher boiling polymers and to recycle the isobutane from the polymerization unit to the dehydrogenation unit. In this procedure it is permissible to pass the whole reaction product from the dehydrogenation unit through the polymerization unit and to recycle the sulfur compounds, such as sulfur dioxide, back to the dehydrogenation unit with the isobutane. The use of sulfur dioxide in the dehydrogenation makes this combination of steps much more desirable than would be the case with a combination of ordinary catalytic dehydrogenation and polymerization because in the latter case hydrogen builds up in the recycled gases to such an extent as to greatly reduce the efficiency of the dehydrogenation step whereby it is usually necessary to include between the polymerization step and the dehydrogenation step, equipment for eliminating hydrogen from the recycled gas, this step being accompanied by a considerable loss of energy.

The nature and the objects of the present invention having thus been described and its advantages experimentally illustrated, what is claimed as new and useful and desired to be secured by Letters Patent is:

1. In the catalytic dehydrogenation of hydrocarbons at temperatures in excess of about 650° F., the step which comprises contacting said hydrocarbons with a catalyst in the presence of an oxide of sulfur.

2. A process for the conversion of isobutane to isobutylene which comprises passing a mixture of isobutane and sulfur dioxide over a dehydrogenation catalyst at a temperature between about 650° F. and 1150° F.

3. A process for the conversion of isobutane into liquid polymers of the gasoline boiling range which comprises passing a mixture of isobutane and sulfur dioxide over a dehydrogenation catalyst, contacting the resulting products with a catalyst capable of polymerizing isobutylene at a suitable polymerization temperature whereby true liquid polymers are formed, separating the liquid polymers from the reaction mixture leaving the polymerization zone and recycling the remainder of said reaction mixture to the dehydrogenation zone.

4. A process according to the preceding claim in which the reaction mixture leaving the dehydrogenation zone is subjected to a treatment for the removal of sulfur and its compounds prior to being introduced into the polymerization zone.

5. A process according to claim 3 in which sulfur dioxide and steam are added to the reaction mixture leaving the dehydrogenation zone, and the resulting mixture is maintained under suitable conditions for a suitable period to effect a reaction between the sulfur dioxide and any hydrogen sulfide in said reaction mixture to form sulfur, and the sulfur so produced is removed from the reaction mixture by condensation prior to the introduction of said reaction mixture into the polymerization zone.

6. A process for the conversion of a normally gaseous paraffin into the corresponding olefin which comprises passing a mixture of said paraffin and sulfur dioxide into contact with a dehydrogenation catalyst at a temperature suitable for the conversion, contacting the reaction mixture with a liquid capable of absorbing olefins, and recycling the resulting gas mixture to the dehydrogenation zone.

7. A process according to claim 1 in which the catalyst contains an oxide of a metal of Group VI of the periodic system.

8. A process according to claim 6 in which the dehydrogenation catalyst contains an oxide of a metal of Group VI of the periodic system.

9. A process according to claim 6 in which the catalyst is composed of a mixture of chromic oxide and alumina deposited on porous stoneware.

10. A process according to claim 6 in which the temperature employed is between 900° F. and 1100° F.

11. A process for converting a hydrocarbon into a less saturated hydrocarbon which comprises subjecting a mixture of said hydrocarbon and an oxide of sulfur to a temperature sufficiently high to split off hydrogen from said hydrocarbon, said temperature being at least 650° F. and being higher the lower the molecular weight of the initial hydrocarbon material.

RAPHAEL ROSEN.